United States Patent [19]

Van De Vanter

[11] Patent Number: 5,802,262
[45] Date of Patent: Sep. 1, 1998

[54] METHOD AND APPARATUS FOR DIAGNOSING LEXICAL ERRORS

[75] Inventor: Michael L. Van De Vanter, Mountain View, Calif.

[73] Assignee: Sun Microsystems, Inc., Mountain View, Calif.

[21] Appl. No.: 950,857

[22] Filed: Oct. 15, 1997

Related U.S. Application Data

[63] Continuation of Ser. No. 305,220, Sep. 13, 1994, abandoned.
[51] Int. Cl.⁶ .................................................. G06F 17/27
[52] U.S. Cl. ........................................ 395/180; 704/9
[58] Field of Search ............................. 395/180, 707; 704/9; 707/531; 364/280

[56] References Cited

U.S. PATENT DOCUMENTS

| | | | |
|---|---|---|---|
| 4,989,145 | 1/1991 | Kyushima | 364/419 |
| 5,386,570 | 1/1995 | Lindhorse | 395/700 |
| 5,410,701 | 4/1995 | Gopalraman | 395/700 |
| 5,487,000 | 1/1996 | Takahashi | 364/419.08 |
| 5,487,147 | 1/1996 | Brisson | 395/180 |

OTHER PUBLICATIONS

Proceedings of the Summer 1988 Usenix Conference, San Franciso, CA, USA, 21–24 Jun. 1988, Berkeley, CA USA, Usenix Assoc, USA, pp. 147–160, XP000618129.
Gray R W: "gamma–GLA: a genrator for lexical analyzers that programmers can use", pp. 154–155.
IEEE Transactions on Software Engineering, Jun. 1987, USA, vol. SE–13, No. 6, ISSN 0098–5589, pp. 609–627, XP002026805.
Reiss S P: "Automatic compiler production: the front end" pp. 614–615, p. 622, Appendix A.1.

Lex & Yacc John R. Levine, Tony Moser and Doug Brown O'Reilly & Associates Inc, Subostopal, CA 1992.

Primary Examiner—Michael Horabik
Assistant Examiner—Albert K. Wong
Attorney, Agent, or Firm—Flehr Hohbach Test Albritton & Herbert LLP

[57] ABSTRACT

A method and lexical analyzer for diagnosing lexical errors in a stream of symbols. An error-diagnosing lexical analyzer is constructed by a lexical analyzer generator based on a list of regular expression patterns. The list of regular expression patterns includes patterns which define specific invalid lexeme types as well as specific valid lexeme types. The lexical analyzer generated based on the list of regular expression patterns has a first plurality of states and a second plurality of states. Each state of the first plurality of states represents a specific valid lexeme type and is associated with a label identifying the specific valid lexeme type. Each state of the second plurality of states represents a specific invalid lexeme type and is associated with a label identifying the specific invalid lexeme type. The lexical analyzer reads symbols from a stream of symbols and changes state based on the symbols according to transition rules. When the lexical analyzer reads a terminating character, the lexical analyzer transmits a signal indicating the lexeme type associated with the state of the lexical analyzer at the time the terminating symbol was encountered. The lexeme type indicated in the signal is used to characterize the series of symbols processed prior to encountering the terminating symbol.

19 Claims, 6 Drawing Sheets

METHOD AND APPARATUS FOR DIAGNOSING LEXICAL ERRORS

This is a continuation of application Ser. No. 08/305,220 filed Sep. 13, 1994 now abandoned.

FIELD OF THE INVENTION

The present invention relates to a method and apparatus for diagnosing lexical errors, and more specifically, to a method and apparatus for diagnosing lexical errors in a file containing source code corresponding to a target computer programming language.

BACKGROUND OF THE INVENTION

Most software is initially written in source code corresponding to a target computer programming language. The source code consists of words or "lexemes" composed from symbols in the "alphabet" of the programming language. The source code is converted to machine code prior to or during program execution by a programming tool, such as a compiler. In order for the source code to be accurately converted, the lexemes within the source code must conform to the lexical rules of the target programming language. During a lexical analysis phase of the source code to machine code conversion process, the lexemes contained in the source code are analyzed to determine if they conform to the lexical rules of the programming language. If a scanned lexeme conforms to a lexical rule, it is considered a valid lexeme and is characterized by the particular rule to which it conforms. Otherwise, it is considered an invalid lexeme.

The lexical analysis phase is typically performed by a lexical analyzer. A lexical analyzer may be part of an automatic program generator used to convert source code to machine code. For a lexical analyzer generator to analyze source code, the lexical analyzer must be aware of the lexical rules specific to the target language in which the source code is written.

To assist developers of automatic program generators, lexical analyzer generators have been developed. Lexical analyzer generators are programming tools which generate lexical analyzers. To use a lexical analyzer generator to generate a lexical analyzer for a specific target language, the lexical analyzer generator must first be made aware of the lexical rules of the target language. This awareness may be achieved, for example, by causing the lexical analyzer generator to read a file which expresses the lexical rules of the target language in terms of regular expression patterns. Once aware of the lexical rules of the target language, the lexical analyzer generator generates a lexical analyzer for analyzing source code written in the target language. One such lexical analyzer generator, known as "lex", is described in M. E. Lesk and E. Schmidt, "Lex—A Lexical Analyzer Generator," Bell Laboratories, Murray Hill, N.J. 1975 and John R. Levine, Tony Mason and Doug Brown, "lex and Yack," O'Reilly & Associates, Inc., Sebastapol, Calif., 1992, 2nd Edition.

A typical programming language has one or more terminating symbols. A terminating symbol is a symbol that indicates the end of a lexeme. A terminating symbol may include one or more characters. The symbols which serve as terminating symbols may vary depending on the current state of the analysis. For example, the "+" symbol may not be a terminating symbol in the initial state, but might be a terminating symbol when processing an identifier. The term "terminating symbol", as used herein, shall therefore mean those symbols or strings of symbols which, in the present processing state of the lexical analyzer, indicate the end of a lexeme.

To begin analysis of a source code file, a lexical analyzer assumes an initial state. The lexical analyzer reads a first symbol from the source code file and changes from the initial state to a new state in response to the symbol. The lexical analyzer repetitively reads symbols from the source code and changes state responsive to the symbols until a terminating symbol is detected. Upon the detection of a terminating symbol, the lexical analyzer characterizes the series of symbols which it has just read according to the state of the lexical analyzer when the terminating signal is reached.

An example of a simplified lexical analyzer is illustrated in FIG. 1a. The lexical analyzer 30 in FIG. 1a is configured to recognize two types of valid lexemes: integers and identifiers. In the example, integers consist of any digit between 1 and 9 followed by any number of additional digits between 0 and 9. Identifiers consist of any alphabetic character between a and z followed by any number of alphanumeric characters between a and z or 0 and 9.

Lexical analyzer 30 has four states 32, 34, 36 and 38. State 32 is the initial state, state 34 is the valid identifier state (VIDS), state 36 is the valid integer state (VIS), and state 38 is an invalid lexeme state (ILS). Prior to reading any symbol from a source code file 40, the initial state 32 is the current state. If the first symbol read from source code 40 is a digit between 1 and 9, then state 36 becomes the current state. This state change rule is symbolically represented by an arrow 44. If the first symbol read from source code 40 is an alphabetic character between a and z, then state 34 becomes the current state. This state change rule is represented by an arrow 46. If the first symbol is anything other than a digit between 1 and 9 or an alphabetic character between a and z, then state 38 becomes the current state. This state change rule is represented by an arrow 47.

Assuming that the first symbol was an alphabetic character between a and z, state 34 will remain the current state as long as subsequent input symbols are alphanumeric characters between a and z or 0 and 9. This rule is shown symbolically by an arrow 48. If any other type of symbol, with the exception of the terminating symbols, is received, then state 38 will become the current state.

Similarly, if the first symbol was a digit between 1 and 9, state 36 will remain the current state as long as subsequent input symbols are digits between 0 and 9. This rule is shown symbolically by an arrow 50. If any other type of symbol, with the exception of the terminating symbols, is received, then state 38 will become the current state. As illustrated by an arrow 50, if state 38 becomes the current state, it will remain the current state until a terminating symbol is read from source code 40.

Upon reading a terminating symbol from source code 40, lexical analyzer 30 generates a signal to characterize the type of lexeme represented by the sequence of symbols it has just processed. For example, if the current state of lexical analyzer is state 34 when a terminating symbol is detected, then lexical analyzer 30 generates a signal indicating that the series of symbols just processed represent a valid identifier. Similarly, if the current state of lexical analyzer 30 is state 36 when a terminating symbol is detected, then lexical analyzer 30 generates a signal indicating that the series of symbols just processed represent a valid integer. If the current state of lexical analyzer 30 is state 38 when a terminating symbol is detected, then lexical analyzer 30 generates a signal indicating that the series of symbols just processed represent an invalid lexeme.

To generate the appropriate lexeme identification symbol, each state in lexical analyzer 30 is associated with a label identifying a lexeme type. In the present example, state 34 is associated with a label 52 identifying an identifier lexeme type, state 36 is associated with a label 54 identifying an integer lexeme type, and state 38 is associated with a label 56 identifying an invalid lexeme type. This state-to-label association is established during the construction of the lexical analyzer 30 by a lexical analyzer generator.

Lexical analyzer 30 reflects one type of error detecting lexical analyzer. This type of lexical analyzer detects lexical errors by having a single invalid lexeme state and rules which cause the lexical analyzer to assume the invalid lexeme state whenever a series of characters does not conform to any valid lexeme type. A lexical analyzer such as lexical analyzer 30 may be constructed by a lexical analyzer generator based upon a set of regular expression patterns which includes patterns that match every valid lexeme in a language ("valid regular expression patterns"), and a default regular expression pattern that matches every lexeme that is not a valid lexeme (the "invalid regular expression pattern"). An example of such a regular expression list is included in Appendix I.

In response to such a list, a lexical analyzer generator creates a lexical analyzer having one or more states corresponding to each valid regular expression pattern. Each of the states is labeled with a label identifying the particular type of valid lexeme represented by the state. The lexical analyzer also includes one state (the "invalid lexeme state") which is created responsive to the invalid regular expression pattern.

According to another approach, a lexical analyzer may be constructed by training a lexical analyzer generator with only valid regular expression patterns. All states in the resulting lexical analyzer are associated with labels representing valid lexeme types. As a result, invalid lexemes are categorized as one or more valid lexemes. The sequence of the lexeme types detected by such a lexical analyzer in response to invalid lexemes will typically not conform to the syntax rules of the target programming language. Therefore, during a subsequent parsing phase of the source code to machine code conversion process, a syntax error will probably be generated because of the lexical error.

The performance of lexical analysis according to either of these approaches provides lexical error detection. However, it does not provide feedback for lexical error diagnosis. That is, a lexical analyzer as described above may indicate that something is wrong with a lexeme, but it does not provide any clues as to what specifically is wrong with the lexeme. Helpful information about the invalid lexeme is not preserved and made available to a user to assist the user in diagnosing the detected lexical error.

Based on the foregoing, it is clearly desirable to provide a lexical analyzer which categorizes invalid lexemes to assist a user in diagnosing lexical errors. Further, it is desirable to characterize invalid lexemes in terms of variations of valid lexemes, and to make this characterization available to a user.

SUMMARY OF THE INVENTION

According to one aspect of the present invention, a method for diagnosing lexical errors in a stream of symbols is provided. The stream of symbols contains symbols from an alphabet of a given language. Preferably, the given language is a computer programming language.

According to one embodiment of the method, a lexical analyzer having a set of states is constructed. The set of states includes a first plurality of states and a second plurality of states. The set of states also includes an initial state.

A correlation between the set of states and a set of lexeme types is established. The set of lexeme types includes a first plurality of lexeme types and a second plurality of lexeme types. Each lexeme type of the first plurality of lexeme types represents a valid lexeme type in the given language. Each lexeme type of the second plurality of lexeme types represents an invalid lexeme type in the given language. The correlation associates each state of the first plurality of states with a corresponding lexeme type of the first plurality of lexeme types. The correlation associates each state of the second plurality of states with a corresponding lexeme type of the second plurality of lexeme types.

To begin processing the stream of symbols, the initial state is established as a current state and a symbol from the stream of symbols is read. If the symbol is not a terminating symbol, then a next state is determined based on the symbol and the next state is established as the current state. The steps of reading a symbol and moving to a next state are repeated until the symbol is a terminating symbol. A signal indicative of the lexeme tape associated with the current state is generated when the symbol is a terminating symbol.

According to another aspect of the invention, a method for constructing an error diagnosing lexical analyzer is provided. According to the method, a lexical analyzer generator reads a list of regular expression patterns. The list of regular expression patterns includes a first plurality of regular expression patterns and a second plurality of regular expression patterns. Each regular expression pattern in the first plurality of regular expression patterns defines a valid lexeme type in a given language. Each regular expression pattern in the second plurality of regular expression patterns defines an invalid lexeme type in the given language.

The lexical analyzer generator constructs the lexical analyzer responsive to the list of regular expression patterns. The lexical analyzer has a set of states, including a first plurality of states and a second plurality of states. Each state of the set of states is associated with a regular expression pattern of the list of regular expression patterns by associating each state of the first plurality of states with a regular expression pattern of the first plurality of regular expression patterns, and associating each state of the second plurality of states with a regular expression pattern of the second plurality of regular expression patterns.

A correlation is established between the set of states and a set of lexeme types. The set of lexeme types includes a first plurality of lexeme types and a second plurality of lexeme types. Each lexeme type of the first plurality of lexeme types represents a valid lexeme type in the given language. Each lexeme type of the second plurality of lexeme types represents an invalid lexeme type in the given language. The correlation associates each state of the first plurality of states with a corresponding lexeme type of the first plurality of lexeme types. The correlation associates each state of the second plurality of states with a corresponding lexeme type of the second plurality of lexeme types.

Preferably, the correlation is established between the set of states and the set of lexeme types by establishing a correlation between each state of the first plurality of states and the valid lexeme type of the first plurality of lexeme types represented by the regular expression pattern associated with the each state of the first plurality of states, and establishing a correlation between each state of the second plurality of states and the invalid lexeme type of the second plurality of lexeme types represented by the regular expression pattern associated with the each state of the second plurality of states.

Patterns for the list of regular expression patterns may be constructed by determining a first regular expression pattern indicative of a beginning of a particular valid lexeme type and inserting the first regular expression pattern into the list of regular expression patterns. A second regular expression pattern indicative of a valid ending of the particular valid lexeme type is determined. A third regular expression pattern represents the first regular expression pattern followed by the second regular expression pattern is determined. The third regular expression pattern is inserted into the list of regular expression patterns.

A fourth regular expression pattern indicative of an invalid ending of the particular valid lexeme type is determined. A fifth regular expression pattern representing the first regular expression pattern followed by the fourth regular expression pattern is then determined. The fifth regular expression pattern is inserted into the list of regular expression patterns.

According to yet another aspect of the invention, a lexical analyzer for diagnosing lexical errors in a stream of symbols is provided. The stream of symbols contains symbols from an alphabet of a given language. The lexical analyzer has a set of states and includes a current state indication mechanism, a symbol input unit, a symbol comparison unit, a state change mechanism and a lexeme type signal generator.

The set of states includes a first plurality of states and a second plurality of states. The set of states includes an initial state. Each state of the set of states is associated with a lexeme type of a set of lexeme types. The set of lexeme types includes a first plurality of lexeme types and a second plurality of lexeme types. Each lexeme type of the first plurality of lexeme types is a valid lexeme type in the given language. Each lexeme type of the second plurality of lexeme types is an invalid lexeme type in the given language.

Each state of the first plurality of states is associated with a corresponding lexeme type of the first plurality of lexeme types. Each state of the second plurality of states is associated with a corresponding lexeme type of the second plurality of lexeme types.

The current state indication mechanism initially establishes the initial state as a current state. The symbol input unit repetitively reads symbols from the stream of symbols. The symbol comparison unit determines if a symbol read from the stream of symbols by the symbol input unit is a terminating symbol. The state change mechanism moves from the current state to a next state of the set of states when the symbol is not a terminating symbol. The current state indication mechanism then establishes the next state as the current state. The lexeme type signal generator generates a signal indicative of the lexeme type associated with the current state when the symbol is a terminating symbol. If the series of symbols represents a valid lexeme, then the current state will correspond to a specific valid lexeme type and the signal generated will indicate the valid lexeme type. If the series of symbols represents an invalid lexeme, then the current state will correspond to specific invalid lexeme type and the signal generated will indicate the invalid lexeme type. Consequently, the signal categorizes both valid and invalid lexemes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for diagnosing lexical errors in stream of symbols is described. The stream of symbols may be, for example, from a source code file. In the following description, for the purposes of explanation, numerous specific details such as software tools, platforms, operating systems and programming languages are set forth in order to provide a thorough understanding of the present invention. However, the present invention may be practiced without these specific details. In other instances, well-known structures and devices are shown in block diagram form in order to avoid unnecessarily obscuring the present invention.

Figure 1A:
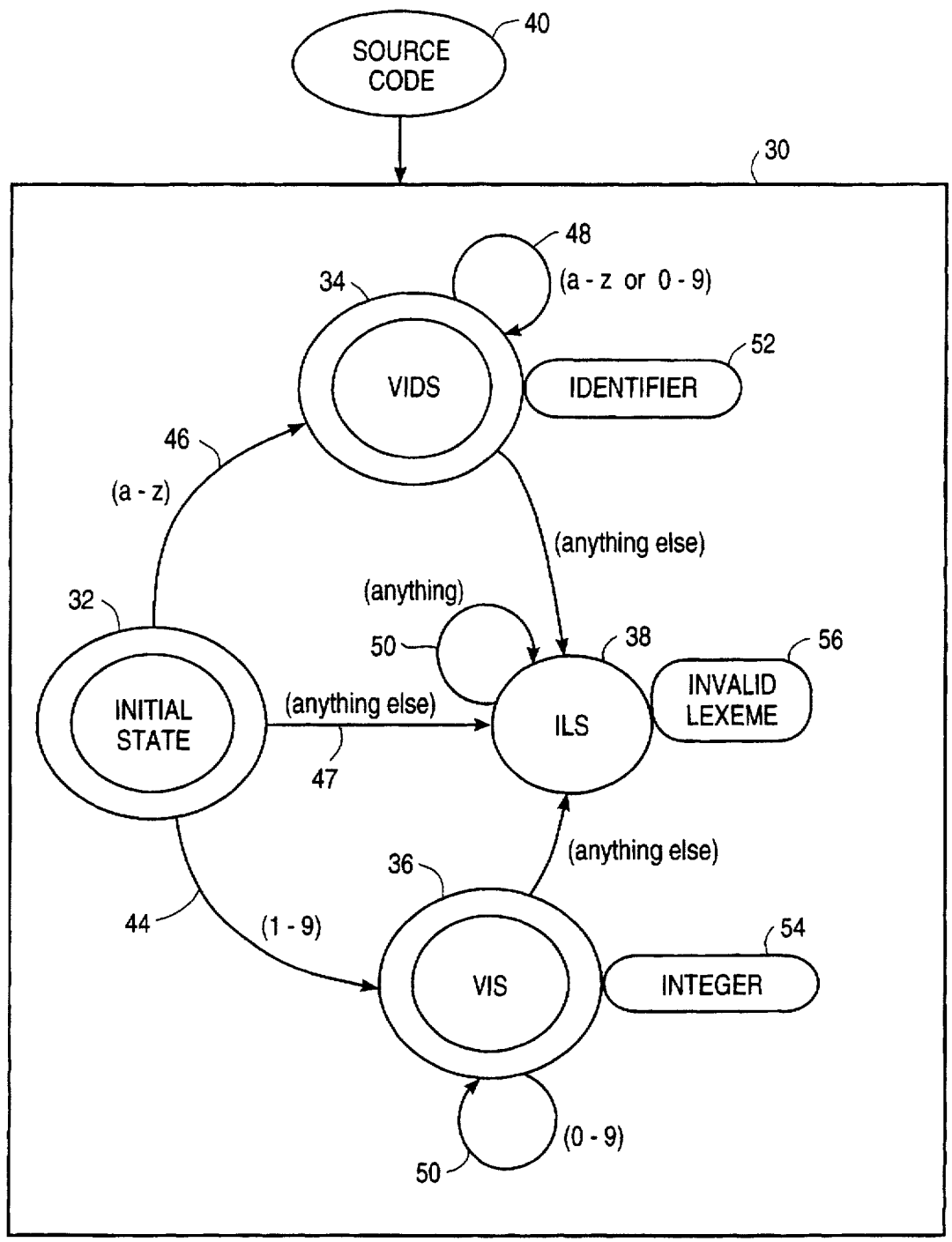
FIG. 1a illustrates a lexical analyzer which detects lexical errors.
Figure 1B:
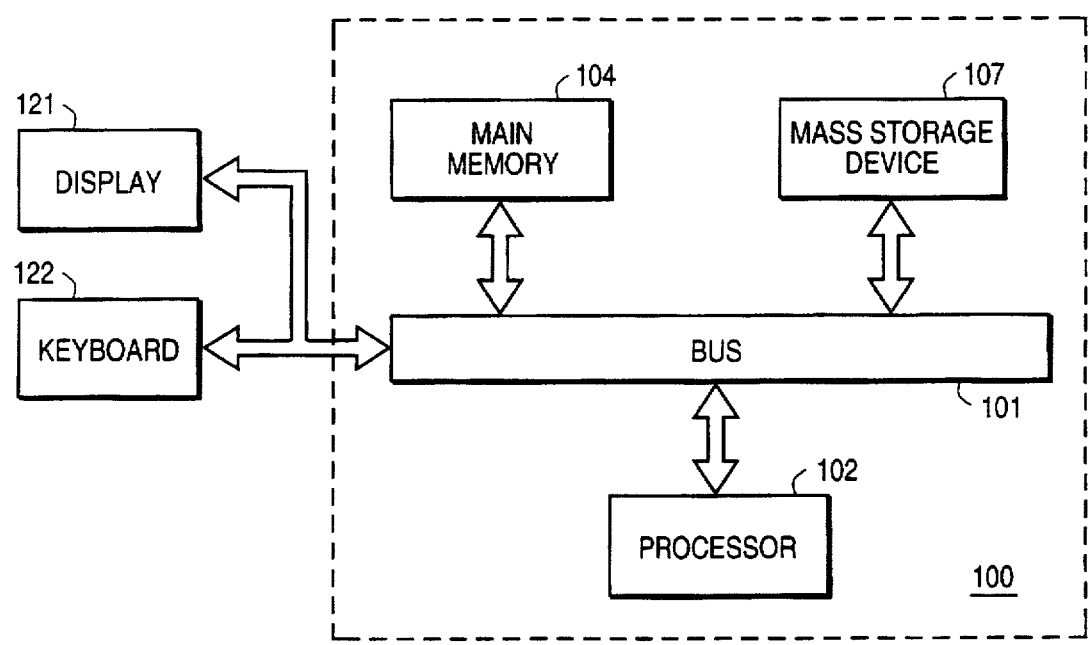
FIG. 1b illustrates a computer system for implementing an error-diagnosing lexical analyzer according to an embodiment of the present invention.

Referring to FIG. 1b, a computer system 100 upon which the preferred embodiment of the present invention can be implemented is shown. Computer system 100 comprises a bus or other communication means 101 for communicating information, and a processing means 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102.

Furthermore, a data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102.

The present invention is related to the use of computer system 100 to diagnose lexical errors in a stream of symbols. Computer system 100 detects lexical errors in the stream of symbols by executing a lexical analysis program which processes the stream of symbols. The various processing mechanisms involved in the lexical analysis process shall now be described in greater detail with reference to FIGS. 2a and 2b.

Figure 2A:
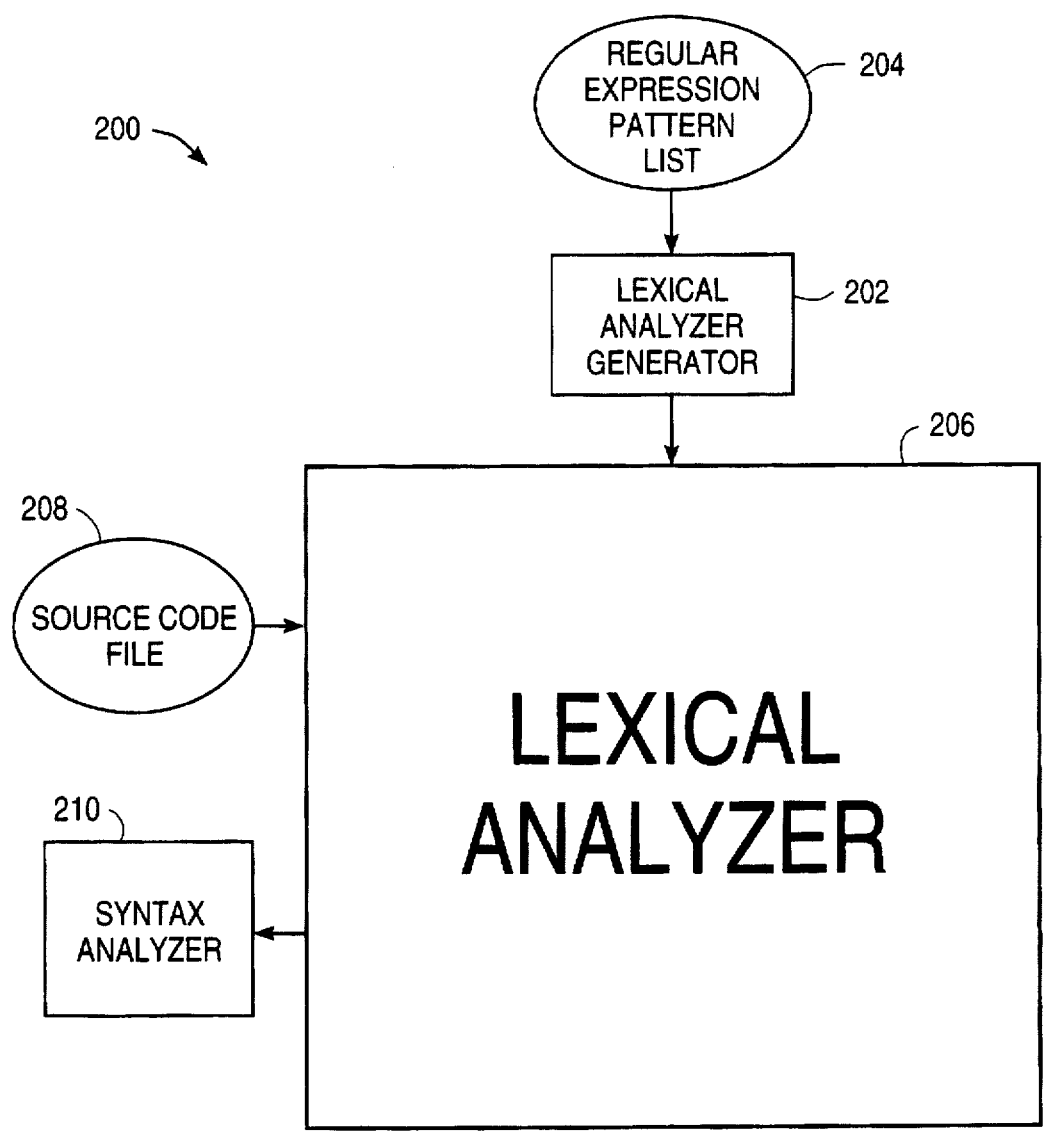
FIG. 2a is a block diagram illustrating an error-diagnosing lexical analysis system according to one embodiment of the invention.

Referring now to FIG. 2a, it illustrates in block diagram form a mechanism 200 for diagnosing lexical errors in a stream of symbols. For the purposes of explanation, it shall be assumed that the stream of symbols comes from a source code file 208. However, the stream of symbols may alternatively come from other sources. The mechanism 200 generally includes a lexical analyzer generator 202 and a lexical analyzer 206. According to one embodiment of the invention, lexical analyzer generator 202 constructs lexical analyzer 206 based on a regular expression pattern list 204.

Regular expression pattern list 204 may reside in memory 104 or on storage device 107. Regular expression pattern list 204 generally represents a series of regular expression patterns. Each regular expression pattern in the regular expression pattern list 204 defines and corresponds to a particular lexeme type. Unlike the regular expression pattern lists employed to construct lexical analyzers in the prior art, regular expression pattern list 204 includes a plurality of regular expression patterns which define invalid lexeme types as well as a plurality of regular expression patterns which define valid lexeme types. As a consequence of this difference, a finite state machine which is capable of diagnosing as well as detecting lexical errors may be constructed, as will be described hereafter.

An example of a regular expression pattern list constructed according to an embodiment of the present invention is included in Appendix II. Referring to the exemplary regular expression pattern list in Appendix II, the list contains two sections. The first section is a definition section where various regular expression patterns are defined. For example, the regular expression pattern "octdig" is defined as |0–7|, meaning any digit in the range of 0 to 7, inclusive. The definition of a regular expression pattern may include identifiers of other regular expression patterns. For example, the regular expression pattern "esc" is defined with reference to three previously defined regular expression patterns "chresc", "hexesc", and "octesc".

The second section of the exemplary regular expression pattern list in Appendix II contains the list of regular expression patterns the lexical analyzer generator 202 reads to construct a lexical analyzer, such as lexical analyzer 206. The lexical analyzer generation process shall be described in greater detail below.

The exemplary list of regular expression patterns contains regular expression patterns for valid lexeme types and invalid lexeme types. Regular expression patterns which correspond to valid lexeme types include, for example, "identifier", "char", "float", "int", and "string". Regular expression patterns which correspond to invalid lexeme types include "inc_char", "right_inc_char", "bad_char", "incomplete_float", "bad_float", "incomplete_int", "bad_int", "bad_hexint", "inc_string", "right inc_string", and "bad_string". The regular expression patterns for both the invalid lexeme types and the valid lexeme types are defined in the definition section of Appendix II.

The regular expression pattern list identifies a regular expression pattern defined in the definition section, and associates with the regular expression pattern a routine and a return label. The routine, "set_token", designates an operation to be performed by the lexical analyzer when a lexeme matching the regular expression pattern is encountered. The return label is a label identifying the lexeme type defined by the regular expression pattern. For example, the regular expression pattern "identifier" is associated with the return label IDENTIFIER. The return label IDENTIFIER identifies the lexeme type defined by the regular expression pattern "identifier". The purpose of the labels associated with the regular expression patterns shall be described in greater detail below.

It should be understood that the regular expression pattern list in Appendix II is merely exemplary. The form of the list will vary based on the lexical analyzer generator to be used with the list. The specific regular expression patterns and labels of a list will vary based on the lexical rules of the target language corresponding to the list.

Lexical analyzer generator 202 represents a lexical analyzer generator configured to construct lexical analyzer 206 in response to the regular expression pattern list 204. Lexical analyzer generator 202 may be, for example, the "lex" lexical analyzer generator cited above. The regular expression pattern lists contained in Appendices I and II are formatted for the "lex" lexical analyzer generator. Symbols used in regular expressions in the "lex" format have the meanings described in Table 1.

TABLE 1

| Symbol | Description |
| --- | --- |
| . (period) | Matches any single character except the newline character |
| * | Matches zero or more copies of the preceding expression |
| [ ] | Matches any one character within the brackets. |
| ^ | Matches the beginning of a line as the first character. |
| { } | Indicates how many times the previous pattern is allowed to match. (e.g. x{5,10} matches five to ten occurrences of the letter "x". |
| \ | Used to identify escape sequences (e.g. "\n" is a newline character) and to identify literal characters from metacharacters (e.g. "\*" is a literal asterisk). |
| + | Matches one or more occurrence of the preceding regular expression. |
| ? | Matches zero or one occurrence of the preceding regular expression. |
| \| | Matches either the preceding regular expression or the following regular expression. |
| ( ) | Groups a series of regular expressions together into a new regular expression. |

Figure 2B:
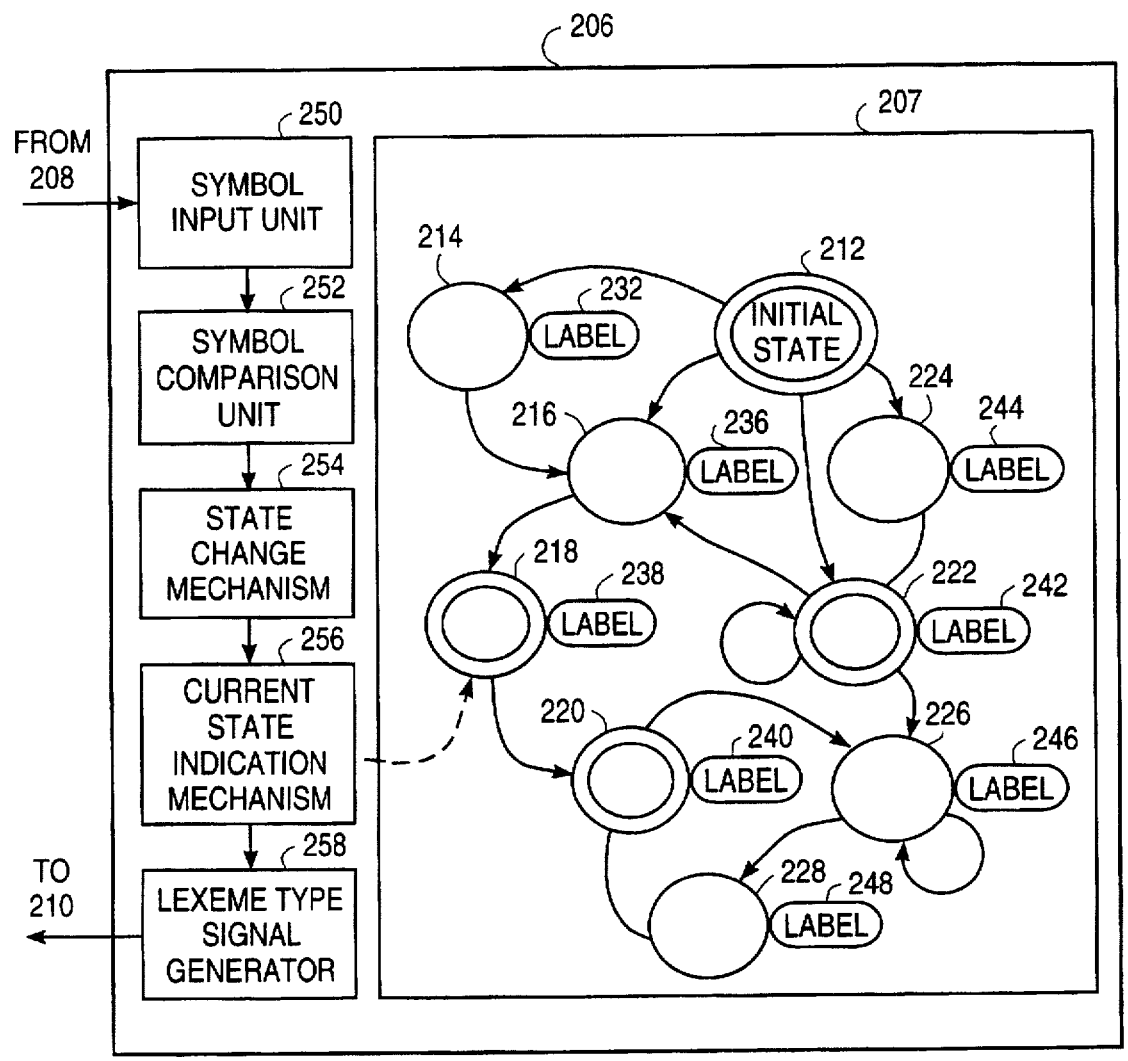
FIG. 2b is a block diagram illustrating the lexical analyzer of FIG. 2a in greater detail.

Referring to FIG. 2b, it illustrates lexical analyzer 206 in greater detail. Lexical analyzer 206 generally includes a plurality of states 207, a symbol input unit 250, a symbol comparison unit 252, a state change mechanism 254, a current state indication mechanism 256 and a lexeme type signal generator 258. The plurality of states 207 include states 212, 214, 216, 218, 220, 222, 224, 226 and 228. The plurality of states are linked by arrows representing state transition rules.

State 212 is the initial state of lexical analyzer 206. States 218, 220 and 222 represent "okay states". An okay state is any state that is the current state when the series of symbols most recently processed by the lexical analyzer 206 represents a particular valid lexeme type. For example, state 222 may correspond to valid integers. State 222 will become the current state if the first symbol represents a digit between 1 and 9. State 222 will remain the current state as long as subsequent symbols are digits between 0 and 9. Because state 222 will be the current state after lexical analyzer has processed symbols which constitute a valid integer, state 222 is an okay state.

States 214, 216, 224, 226 and 228 represent invalid states. An invalid state is any state that is the current state when the series of symbols most recently processed by the lexical analyzer 206 does not represent any valid lexeme type. Therefore, any state which is not an okay state is an invalid state.

States 214, 216, 218, 220, 222, 224, 226 and 228 are associated with labels 232, 236, 238, 240, 242, 244, 246 and 248 respectively. Each of labels 232, 236, 238, 240, 242, 244, 246 and 248 represents a lexeme type. Labels 238, 240, and 242 are associated with okay states and represent valid lexeme types. Labels 232, 236, 244, 246 and 248 are associated with invalid states and represent invalid lexeme types. Preferably, the invalid lexeme types are invalid variations of the valid lexeme types.

At any given point while lexical analyzer 206 is processing a series of symbols from source code file 208, some state of lexical analyzer 206 will be the current state. The label associated with the current state identifies the lexeme type corresponding to the series of symbols which have been processed up to that point. For example, if state 222 is the current state after lexical analyzer 206 processes a series of symbols which constitute a valid integer, then label 242 will identify the "valid integer" lexeme type. Similarly, if state 216 is the current state after lexical analyzer 206 processes a series of symbols which constitute an invalid integer, then label 236 will identify the "invalid integer" lexeme type.

Lexical analyzer generator 202 establishes a correlation between labels and states based on the correlation of regular expression patterns to labels in the regular expression pattern list 204. For example, in the exemplary regular expression pattern list in Appendix II, the label "CHARACTER_LITERAL" is associated with the regular expression pattern (char) which is defined as '({simplechar}|'|{esc})'. During the generation of lexical analyzer 206, the lexical analyzer generator 202 creates one or more states to correspond to the regular expression pattern {char} and establishes a path from the initial state to the new states. The path is constructed in such a way as to insure that one of the new states will be the current state if and only if a series of symbols read by the lexical analyzer 206 conforms to the regular expression pattern {char}. The label "CHARACTER_LITERAL" is then associated with the new states.

Once the lexical analyzer generator 202 has processed all of the regular expression patterns in the regular expression pattern list 204 in the manner described above, the resulting lexical analyzer 206 is configured to analyze source code file 208. The lexical analysis process shall now be describe with reference to FIG. 3.

Figure 3:
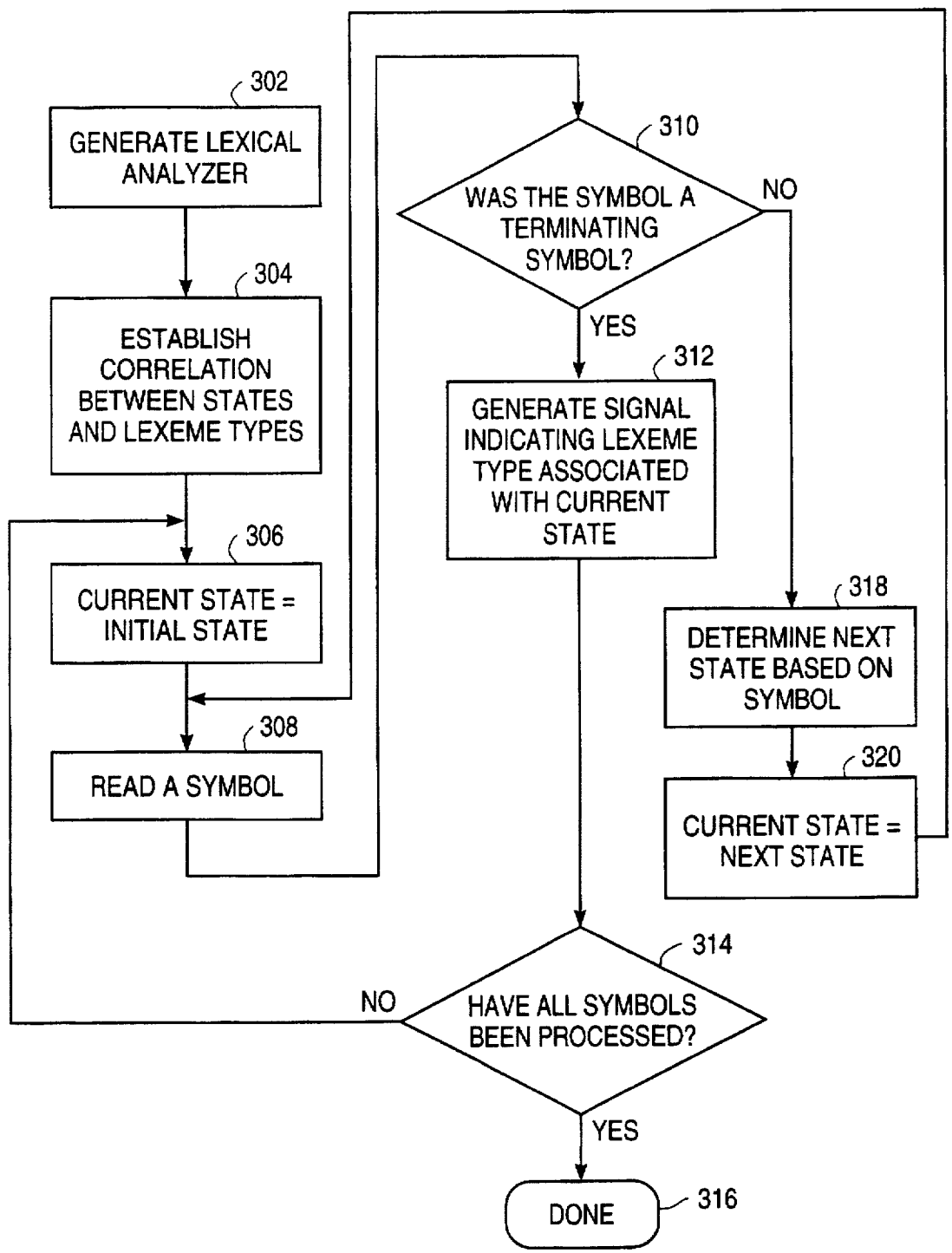
FIG. 3 is a flow chart illustrating a method for diagnosing lexical errors in a source code file according to one embodiment of the invention.

FIG. 3 is a flow chart illustrating a method for diagnosing lexical errors in a source code file, such as source code file 208. At step 302, lexical analyzer 206 is generated responsive to the lexical rules of a target programming language. Preferably, the lexical analyzer 206 is generated by lexical analyzer generator 202 based on regular expression pattern list 204 which includes regular expression patterns for both valid lexeme types and invalid lexeme types, as described above. At step 304 a correlation is established between the states in the lexical analyzer and the lexeme types corresponding to the states. Preferably, this correlation is established during the generation of the lexical analyzer 206 based on the regular expression pattern-to-lexeme type label associations set forth in the regular expression pattern list 204.

At step 306, the initial state 212 of the lexical analyzer is established as the current state. The current state is indicated by current state indicating mechanism 256. Current state indicating mechanism 256 may be, for example, by a pointer which points to the state of states 207 which is the current state. Therefore, step 306 may be performed by causing the current state indicating mechanism 256 to point to the initial state 212.

At step 308, the symbol input unit 250 reads a symbol from the source code file 208. The symbol read from the source code file 208 shall be referred to hereafter as the input symbol. Preferably, the symbol input unit 250 reads the source code file 208 sequentially. Therefore, the first input symbol will be the first symbol present in the source code file 208.

At step 310, the symbol comparison unit 252 determines whether the input symbol is a terminating symbol. If the input symbol is a terminating symbol, then control passes to step 312. Otherwise, control passes to step 318. For the purposes of explanation, it shall be assumed that the first input symbol was not a terminating symbol. Therefore, control will pass to step 318.

At step 318, the state change mechanism 254 determines a next state based on the input symbol. The next state is determined by inspecting the paths leading from the current state. Each path is associated with a set of symbols. Each path implements a transition rule by specifying a next state to move to when the input symbol belongs to its associated set of symbols. Once the next state is determined, the next state is established as the current state at step 320. This may be accomplished, for example, by causing the current state indication mechanism 256 to point to the state which was determined to be the next state.

Once the new current state is established, control passes back to step 308, where a second input symbol is read from the source code file. At step 310 it is determined whether the new input symbol is a termination symbol. If the new input symbol is not a terminating symbol, a new current state will be established by again performing steps 318 and 320. This process of reading input symbols and changing state in response to the input symbols is repeated until the input symbol is a terminating symbol. When the input symbol is a terminating symbol, control passes to step 312.

At step 312, the lexeme type signal generator 258 generates a signal indicating the lexeme type associated with the current state. The lexeme type of the current state is identified by the lexeme type label associated with the current state. The lexeme type identified in the signal serves to characterize the series of input symbols processed by the lexical analyzer 206. The lexeme type signal may be sent, for example, to a syntax analyzer 210 which may analyze the order and arrangement of the lexeme types according to the syntax rules of the target language.

If the lexeme label of the current state indicates an invalid lexeme type, then the lexical analyzer 206 may cause an error message to be sent to the user. Preferably, the error signal indicates not only that a lexical error was detected, but diagnoses the error by indicating the specific type of invalid lexeme that was detected.

At step 314, symbol input unit 250 determines whether all of the symbols within source code file 208 have been processed. If source code file 208 contains symbols which have not yet been processed, then control passes back to step 306. The steps described above are repeated until all of the symbols in source code file 208 have been processed. At that point, control will pass to step 316 and the lexical analysis of source code file 208 will be complete.

Lexical analyzer 206 is able to diagnose lexical errors because it includes states corresponding to specific invalid lexeme types, rather than a single generic invalid state (as lexical analyzer 30), or no invalid state at all. Preferably, lexical analyzer 206 includes no generic or default invalid state at all. To generate a lexical analyzer without a generic invalid state, the type-specific states (the union of the valid lexeme type states and the invalid lexeme type states) must cover all possible combinations of the symbols supported by the target programming language.

According to one embodiment, the states of lexical analyzer 206 are generated responsive to regular expression patterns in regular expression pattern list 204 as stated above. Therefore, for the states of lexical analyzer 206 to cover all possible combinations of symbols, at least one regular expression pattern in the regular expression pattern list 204 must cover each possible combination of symbols.

In the preferred embodiment, regular expression pattern list 204 is constructed by expressing complex lexemes, such as "hexint", in terms of successive patterns. Specifically, an initial set of patterns that match all possible symbol combinations is developed The initial set of patterns includes at least one prefix pattern which defines a valid beginning to each complex valid lexeme type. For example, in the exemplary regular expression pattern list in Appendix II, the prefix pattern designated "hexint_prefix" defines a valid beginning to the hexadecimal literal lexeme type. More complex valid lexeme types, such as "float", may have various alternative valid beginnings. Under these circumstances, more than one prefix pattern may be required.

Once the prefix pattern has been established, a pattern is developed which, when combined with the pattern, creates a regular expression pattern which defines a valid hexadecimal literal lexeme type. For example, the regular expression pattern "hexint", which defines a valid hexadecimal literal lexeme, consists of the pattern "hexint_prefix" followed by the pattern "(hexdig)+".

Once the regular expression pattern for a valid lexeme has been formed in this manner, regular expression patterns for invalid variations of the lexeme type may be constructed. For example, the prefix pattern "hexint_prefix" may be used as the real expression to designate an incomplete hexadecimal literal. For example, "incomplete_int" is defined as "{hexint_prefix}". Further, a regular expression pattern which begins with "hexint_prefix" but ends with a pattern different from "{hexdig}+" may be used to designate an invalid hexadecimal literal lexeme. For example "bad_hexint" is defined as "{hexint_prefix}" followed by "[_a–zA–Zi̇++ÿ–~~–˅0–9]+".

Figure 4:
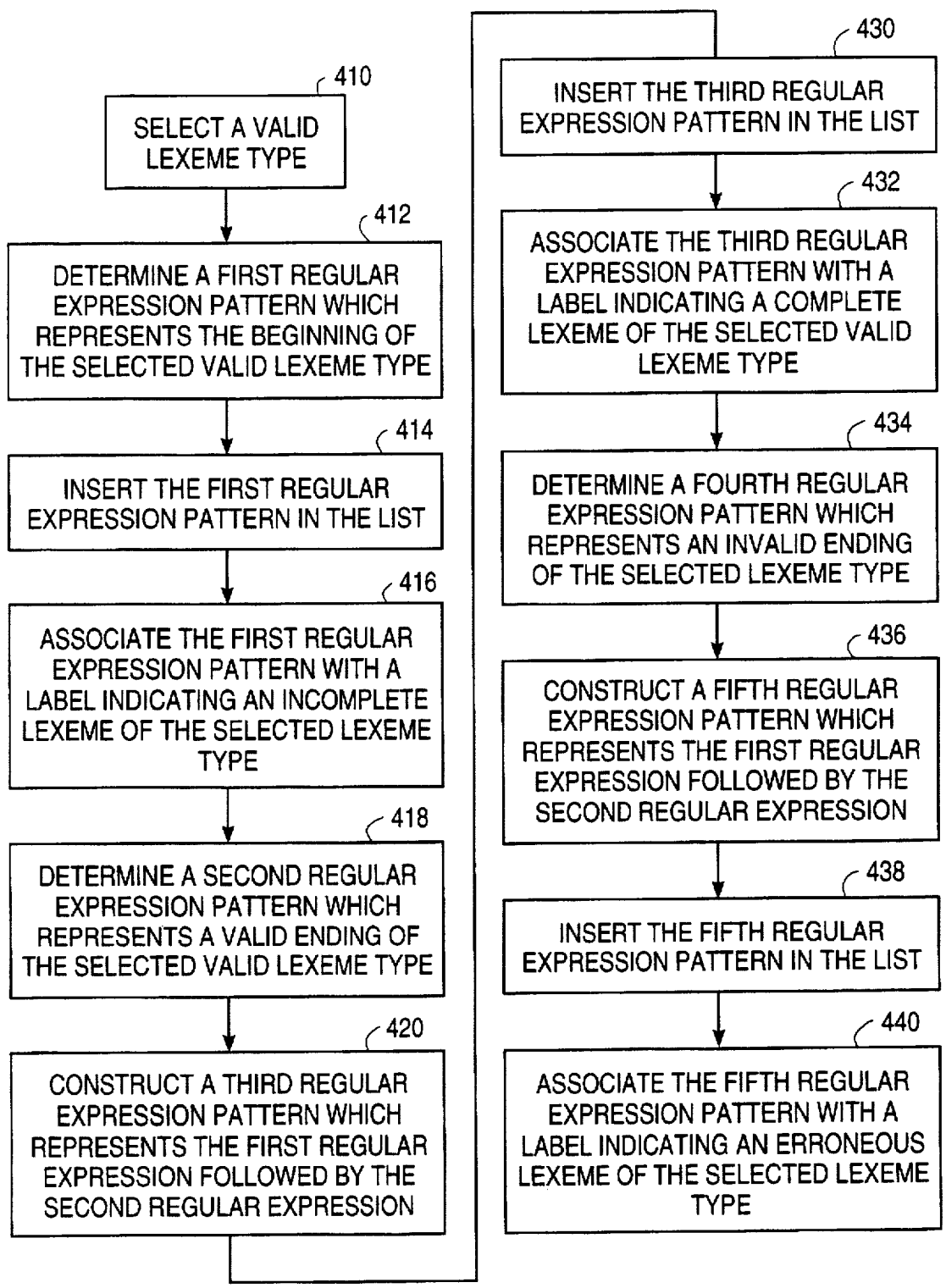
FIG. 4 is a flow chart illustrating a method for constructing regular expressions from which a lexical analyzer generator may construct an error-diagnosing lexical analyzer.

The general steps for designing regular expression patterns for valid, incomplete, and erroneously completed versions of a given complex lexeme type are illustrated in FIG. 4. At step 410, a valid lexeme type of the target language is selected. For the purposes of explanation, it shall be assumed that the lexeme type "hexadecimal literal" was selected at step 410. The regular expression patterns relating to the hexadecimal literal lexeme in the exemplary regular expression pattern list in Appendix II shall be used to illustrate the steps shown in FIG. 4.

At step 412, a first regular expression pattern is determined which represents the beginning of the selected valid lexeme type. In the present example, the regular expression "hexint_prefix" is determined at step 412. As mentioned above, some complex lexeme types have more than one possible valid beginning. For such lexeme types, a separate regular expression is determined for each possible valid beginning.

At step 414, the first regular expression pattern is inserted into the expression list that will be processed by the lexical analyzer generator. In the present example, the regular expression pattern "incomplete_int", which is defined as {hexint_prefix} is inserted into the list of regular expression patterns.

At step 416, the first regular expression pattern is associated with a label indicating an incomplete lexeme of the selected lexeme type. In the present example, this is accomplished by associating the return value INCOMPLETE_INTEGER_LITERAL with the regular expression pattern "incomplete_int" in the list of regular expression patterns.

At step 418, a second regular expression pattern which represents a valid ending of the selected valid lexeme type is determined. In the present example, the regular expression pattern "{hexdig}+" defines a valid ending to hexadecimal literals. At step 420, a third regular expression pattern which represents the first regular expression pattern followed by the second regular expression pattern is constructed. In the present example, the regular expression pattern "hexint" is constructed by combining "hexint_prefix" and "{hexdig}+".

At step 430, the third regular expression pattern is inserted into the regular expression pattern list. In the present example, the regular expression patterns "hexint", "octint", and "decint" are first combined in the alternative to form a composite regular expression pattern "int". Each of the regular expression patterns "hexint", "octint", and "decint" are effectively inserted into the regular expression pattern list by inserting the composite regular expression pattern "int" into the regular expression pattern list.

At step 432, the third regular expression pattern is associated with a label indicating a complete lexeme of the selected valid lexeme type. In the present example, the regular expression pattern "int" is associated with the return value INTEGER_LITERAL.

At step 434, the fourth regular expression pattern which represents an invalid ending of the selected lexeme type is determined. In the present example, an invalid ending of a hexadecimal literal is defined by the regular expression pattern "[_a–zA–Zi̇++ÿ–~~–˅0–9]+".

At step 436, a fifth regular expression pattern which represents the first regular expression pattern followed by the second regular expression pattern is constructed. The regular expression pattern "bad_hexint" is defined as regular expression pattern "hexint_prefix" followed by the regular expression pattern "[_a–zA–Zi̇++ÿ–~~–˅0–9]+".

At steps 438 and 440, the fifth regular expression pattern is inserted in the regular expression pattern list and associated with a label indicating an erroneous lexeme of the selected lexeme type, respectively. In the present example, the regular expression pattern "bad_hexint" is inserted in the regular expression pattern list and associated with the return value BAD_HEXADECIMAL_LITERAL.

A lexical analyzer generated based on the list of real expressions contained in Appendix II will therefore have at least one state labeled INCOMPLETE_HEXADECIMAL_LITERAL, at least one state labeled INTEGER_LITERAL, and at least one state labeled BAD_HEXADECIMAL_LITERAL. When the sequence of input symbols matches regular expression pattern "hexint_prefix", the current state will be a state associated with the label INCOMPLETE_HEXADECIMAL_LITERAL. If a terminating symbol is then read, the signal generated by the lexical analyzer will indicate that the last sequence of symbols represented an incomplete hexadecimal literal. This lexeme characterization would be accurate, since the sequence of symbols constituted a valid beginning to a hexadecimal literal but ended before a valid hexadecimal literal was completed.

When the sequence of input symbols matches regular expression pattern "hexint_prefix" followed by the regular expression pattern "{hexdig}+", the current state will be a state associated with the label INTEGER_LITERAL. If a terminating symbol is then read, the signal generated by the lexical analyzer will indicate that the last sequence of symbols represented a valid integer literal. This lexeme characterization would also be accurate, since the sequence of symbols constituted a valid beginning to a hexadecimal literal followed by a valid ending to a hexadecimal literal, and a hexadecimal literal is one type of integer literal.

When the sequence of input symbols matches regular expression pattern "hexint_prefix" followed by the regular expression pattern "|_a-zA-Z¿++ÿ-¨-˅0-9|+", but does not match the regular expression pattern "int", the current state will be a state associated with the label BAD_HEXADECIMAL_LITERAL. If a terminating symbol is then read, the signal generated by the lexical analyzer will indicate that the last sequence of symbols represented an erroneously completed hexadecimal literal. This lexeme characterization would be accurate, since the sequence of symbols constituted a valid beginning to a hexadecimal literal followed by an invalid ending to the hexadecimal literal.

During the creation of regular expressions to match both valid and invalid lexeme types, as described above, some regular expressions may be defined recursively. For example, one might create a pattern "a" that matches prefixes of a first valid lexeme type. One might then create a pattern "b" such that the pattern "ab" also matches prefixes of the first valid lexeme type. Finally, one might create a pattern "c" such that "abc" matches valid and complete lexemes of the first lexeme type.

Also, it should be noted that, for most lexical analyzer generators, the regular expressions in the regular expression list do not have to match mutually exclusive sets of lexemes. For example, the sequence of symbols "0x5" will match both "hexint" and "bad_hexint". Lexical analyzer generators that do not require mutual exclusiveness have rules to resolve the ambiguity caused by such definitional overlaps. For example, the "lex" analyzer resolves such ambiguities by a "first-longest" rule. Specifically, if a series of symbols matches a first regular expression after five symbols in the series have been processed and matches both the first regular expression and a second regular expression after six symbols have been processed, then the series is characterized based on the second regular expression. Otherwise, if a series of symbols matches two regular expressions after the same number of symbols have been processed, then the first-listed regular expression is used to characterize the series of symbols. Therefore, hexint comes before bad_hexint in the list of regular expressions so that a lexeme will only be characterized as a bad hexadecimal literal if it does not match the regular expression associated with "hexint".

The foregoing description describes a method and apparatus for diagnosing lexical errors. The ability to go beyond mere lexical error detection is achieved because the lexical analyzer includes a plurality of states which represent specific invalid lexeme types, as well as a plurality of states which represent valid lexeme types. According to one embodiment, an error-diagnosing lexical analyzer is constructed by a lexical analyzer generator based on a regular expression pattern list which includes regular expression patterns which includes patterns which define specific invalid lexeme types as well as patterns which define specific valid lexeme types.

While specific embodiments of the present invention have been described, various modifications and substitutions will become apparent to one skilled in the art by this disclosure. Such modifications and substitutions are within the scope of the present invention, and are intended to be covered by the claims.

APPENDIX I

```
hexdig        [0-9a-fA-F]
octdig        [0-7]
identifier    [a-zA-Z] [a-zA-Z0-9_]*
exponent      ([eE]|+-|?|0-9|+)
fp1           ([0-9|+\.[0-9]*{exponent}?)
fp2           ([0-9]*\.[0-9]+{exponent}?)
fp3           ([0-9]+{exponent})
float         ({fp1}|{fp2}|{fp3}) |fFlL|?
int_suffix    ([uU]|[lL]|[uU] |1L|)|([1L] |uU]))
decint        ([1-9] [0-9]*)
hexint        (0[xX] {hexdig}+)
octint        (0{octdig}*)
int           ({decint}|{hexint}|{octint}) {int_suffix}?
chresc        (\\[ntvbrfa\\?"])
hexesc        (\\[xX] ({hexdig} {1,2}))
octesc        (\\({octdig} {1,3}))
esc           ({chresc}|{hexesc}|{octesc})
char          '([^\n]|{esc})'
strchr        ([^"\n]|{esc})
string        \"({strchr}*)\"
%%
|\n|+   { }
{identifier}  { set_token( ); return IDENTIFIER; }
{char}        { set_token( ); return CHARACTER_LITERAL; }
{int}         { set_token( ); return INTEGER_LITERAL; }
{float}       { set_token( ); return FLOATING_PT_LITERAL; }
{string}      { set_token( ); return STRING_LITERAL; }
              { set_token( ); return ERROR; }
%%
```

APPENDIX II

SECTION 1

```
hexdig           [0-9a-fA-F]
octdig           [0-7]
identifier       [_a-zA-Z] [_a-zA-Z0-9]*
exp_prefix       ([eE] [+-]?)
exponent         ({exp_prefix} [0-9]+)
inc_fp1          ([0-9]+\.[0-9]*)
fp1              ({inc_fp1} {exponent}?)
inc_fp2          ([0-9]*\.[0-9]+)
fp2              ({inc_fp2} {exponent}?)
inc_fp3          ([0-9]+)
fp3              ({inc_fp3} {exponent})
fp_suffix        ([fFlL])
float            ({fp1}|{fp2}|{fp3}) {fp_suffix}?
incomplete_float
                 ({inc_fp1}|{inc_fp2}|{inc_fp3}) {exp_prefix}
bad_float
                 ({inc_fp1}|{inc_fp2}|{inc_fp3}) {exp_prefix} {fp_suffix}?
decint           ([1-9] [0-9]*)
octint           (0{octdig}*)
hexint_prefix    (0[xX])
hexint           ({hexint_prefix} {hexdig}+)
int_suffix       ([uU]|[1L]|[uU] [1L])|([1L] [uU]))
int              ({decint}|{hexint}|{octint}) {int_suffix}?
incomplete_int   {hexint_prefix}
bad_hexint       {hexint_prefix} [_a-zA-Z¿-+ÿ-¨ -˅0-9]+
bad_int          [0-9] [_a-zA-Z¿-+ÿ-¨ -˅0-9]*
simplechar       [^\n\\']
esc_prefix       \\
chresc           ({esc_prefix} [ntvbrfa\\?"])
octesc           ({esc_prefix} ({octdig} {1,3}))
inc_hexesc       ({esc_prefix} [Xx])
hexesc           ({inc_hexesc} ({hexdig} {1,2}))
esc              ({chresc}|{hexesc}|{octesc})
inc_esc          ({esc_prefix}|{inc_hexesc})
bad_esc          ({esc_prefix} [^\nntvbrfa\\?"])
inc_char         '
right_inc_char   '(({simplechar}|'|{esc}|{inc_esc})
char             '({simplechar}|'|{esc})'
bad_char
                 '({simplechar}|{esc}|{bad_esc})*({inc_esc}|')?
stringchar       [^"\n\\]
```

APPENDIX II-continued

```
inc_string            \"
right_inc_string      \"({stringchar}|{esc})*{inc_esc}?
string                \"({stringchar}|{esc})*\"
bad_string            \"({stringchar}|{esc}|{bad_esc})*\"?
whitespace            [ \t\n]+
illegal               [\001-\010\013-\037#\"\177-\277f0]
%%
```

SECTION 2

```
{whitespace}        { }
{identifier}        { set_token( ); return IDENTIFIER; }
{inc_char}          { set_token( ); return
INCOMPLETE_CHARACTER_LITERAL; }
{char}              { set_token( ); return CHARACTER_LITERAL; }
{right_inc_char}    { set_token( ); return
RIGHT_INCOMPLETE_CHARACTER_LITERAL; }
{bad_char}          { set_token( ); return
BAD_CHARACTER_LITERAL; }
{float}             { set_token( ); return FLOATING_PT_LITERAL;
}
{incomplete_float}  { set_token( ); return
INCOMPLETE_FLOATING_PT_LITERAL; }
{bad_float}         { set_token( ); return
BAD_FLOATING_PT_LITERAL; }
{int}               { set_token( ); return INTEGER_LITERAL; }
{incomplete_int}    { set_token( ); return
INCOMPLETE_INTEGER_LITERAL; }
{bad_hexint}        { set_token( ); return
BAD_HEXADECIMAL_LITERAL; }
{bad_int}           { set_token( ); return BAD_INTEGER_LITERAL; }
{string}            { set_token( ); return STRING_LITERAL; }
{inc_string}        { set token( ); return
INCOMPLETE_STRING_LITERAL; }
{right_inc_string}  { set_token( ); return
RIGHT_INCOMPLETE_STRING_LITERAL;}
{bad_string}        { set_token( ); return BAD_STRING_LITERAL;
}
{illegal}           { set_token( ); return ILLEGAL_CHARACTER; }
.                   { should_not_happen( ); }
%%
```

What is claimed is:

1. A lexical analyzer for diagnosing lexical errors in a stream of symbols, the stream of symbols containing symbols from an alphabet of a given language, the lexical analyzer comprising:

a set of states including a first plurality of states and a second plurality of states;

said set of states including an initial state, each state of said set of states being associated with a lexeme type of a set of lexeme types;

said set of lexeme types including a first plurality of lexeme types and a second plurality of lexeme types, each lexeme type of said first plurality of lexeme types being a valid lexeme type in said given language, said second plurality of lexeme types including all possible invalid lexeme types that can be formed in said stream of symbols in said given language;

wherein each state of said first plurality of states is associated with a corresponding lexeme type of said first plurality of lexeme types, and each state of said second plurality of states is associated with a corresponding lexeme type of said second plurality of lexeme types;

a current state indication mechanism configured to initially establish said initial state as a current state;

a symbol input unit configured to repetitively read symbols from said stream of symbols;

a symbol comparison unit configured to determine if a symbol read from said stream of symbols by said symbol input unit is a terminating symbol;

a state change mechanism configured to move from said current state to a next state of said set of states when said symbol is not a terminating symbol, said current state indication mechanism establishing said next state as said current state; and a lexeme type signal generator configured to generate a signal indicative of the lexeme type associated with the current state when said symbol is a terminating symbol.

2. The lexical analyzer of claim 1, wherein the set of states comprise all possible combinations of the symbols of the alphabet of the given language.

3. The lexical analyzer of claim 1, of wherein the second plurality of lexeme types comprises invalid versions of the valid lexeme types.

4. The lexical analyzer of claim 3, wherein the second plurality of lexeme types comprises incomplete versions of the valid lexeme types and incorrectly completed versions of the valid lexeme types.

5. The lexical analyzer of claim 1, wherein:

said lexical analyzer is generated by a lexical analyzer generator responsive to a list of regular expression patterns;

said list of regular expression patterns includes a first plurality of regular expression patterns and a second plurality of regular expression patterns;

each regular expression pattern in said first plurality of regular expression patterns defines a valid lexeme type in said given language;

each regular expression pattern in said second plurality of regular expression patterns defines an invalid lexeme type in said given language;

each lexeme type of said first plurality of lexeme types corresponds to a regular expression pattern of said first plurality of regular expression patterns; and each lexeme type of said second plurality of lexeme types corresponds to a regular expression pattern of said second plurality of regular expression patterns.

6. The lexical analyzer of claim 5, wherein said first and second plurality of regular expression patterns represent all possible combinations of the symbols of the given language.

7. The lexical analyzer of claim 5, wherein the regular expressions do not have to match mutually exclusive sets of the lexeme types.

8. The lexical analyzer of claim 7, wherein the regular expressions are ordered such that, when the lexical analyzer operates according to conventional lexical analysis techniques and a series of the symbols matches two of the regular expressions after the same number of symbols has been processed, only one of the matched regular expressions being associated with one of the valid lexeme types, that series is characterized by the lexical analyzer as the valid lexical type.

9. The lexical analyzer of claim 7, wherein the regular expressions are ordered such that, when the lexical analyzer operates according to conventional lexical analysis techniques and when a series of symbols matches at least two of the regular expressions, that series is characterized by the lexical analyzer as one of the invalid lexeme types only if it does not match one of the valid lexeme types.

10. The lexical analyzer of claim 5, wherein said second plurality of regular expression patterns defines all invalid versions of said valid lexeme types that can be formed with the symbols of the given language.

11. The lexical analyzer of claim 6 wherein said list of regular expression patterns includes:

a first regular expression pattern indicative of a beginning of a particular valid lexeme type; and a third regular expression pattern representative of said first regular expression pattern followed by a second regular expression pattern;

the second regular expression pattern being indicative of a valid ending of said particular valid lexeme type.

12. The lexical analyzer of claim 11, wherein said list of regular expression patterns further includes:

a fifth regular expression pattern representative of said first regular expression pattern followed by a fourth regular expression pattern;

the fourth regular expression pattern being indicative of an invalid ending of said particular valid lexeme type.

13. A method for constructing a lexical analyzer, comprising the steps of:

defining a list of regular expression patterns including a first plurality of regular expression patterns and a second plurality of regular expression patterns, each regular expression pattern in said first plurality of regular expression patterns defining a valid lexeme type in a given language, said second plurality of regular expression patterns defining all possible invalid lexeme types that can be formed in said given language; and constructing said lexical analyzer so that said lexical analyzer is configured to detect said regular expression patterns in a stream of symbols input to said lexical analyzer in said given language and to report the lexeme types of detected regular expression patterns from the first or second pluralities of regular expression patterns without the need to perform any secondary error analysis following lexical analysis.

14. The method of claim 13, wherein the invalid lexeme types comprise invalid versions of the valid lexeme types.

15. The method of claim 13, wherein the invalid lexeme types comprise incomplete versions of the valid lexeme types and incorrectly completed versions of the valid lexeme types.

16. The lexical analyzer of claim 13, wherein the regular expressions do not have to match mutually exclusive sets of the lexeme types.

17. The lexical analyzer of claim 15, wherein the regular expressions are ordered such that, when the lexical analyzer operates according to conventional lexical analysis techniques and a series of the symbols matches two of the regular expressions after the same number of symbols has been processed, only one of the matched regular expressions being associated with one of the valid lexeme types, that series is characterized by the lexical analyzer as the valid lexical type.

18. The lexical analyzer of claim 16, wherein the regular expressions are ordered such that, when the lexical analyzer operates according to conventional lexical analysis techniques and when a series of symbols matches at least two of the regular expressions, that series is characterized by the lexical analyzer as one of the invalid lexeme types only if it does not match one of the valid lexeme types.

19. The method of claim 13, wherein said lexical analyzer comprises a state machine, further comprising the steps of:

generating from said list of regular expression patterns a set of states defining operation of said lexical analyzer, said set states including a first plurality of states and a second plurality of states;

associating each state of said first plurality of states with one of said first plurality of regular expression patterns;

associating each state of said second plurality of states with one of said second plurality of regular expression patterns;

correlating said first plurality of states with the valid lexeme types; and correlating said second plurality of states with the invalid lexeme types;

such that said lexical analyzer progresses through said states in response to the stream of symbols, only reporting the occurrence in the stream of one of the lexeme types corresponding to the state last visited upon receiving a termination symbol as defined by the given language.

* * * * *

UNITED STATES PATENT AND TRADEMARK OFFICE
CERTIFICATE OF CORRECTION

PATENT NO. : 5,802,262
DATED : September 1, 1998
INVENTOR(S) : Van de Vanter

It is certified that error appears in the above-identified patent and that said Letters Patent is hereby corrected as shown below:

On the title page, under References Cited: Other Publications, line 4, please delete "gamma-GLA: a genrator for lexical analyzers that programmers can use" and add --Gamma-GLA: A Generator for Lexical Analyzers That Programmers Can Use--.

On Column 18, Line 1, in Claim 17, please delete "of claim 15" and add --of claim 16--.

Signed and Sealed this

Thirtieth Day of March, 1999

*Attest:*

*Attesting Officer*

Q. TODD DICKINSON

Acting Commissioner of Patents and Trademarks